(12) United States Patent
Ishihara et al.

(10) Patent No.: US 7,254,992 B2
(45) Date of Patent: Aug. 14, 2007

(54) ROTATION-SENSORED ROTARY CONNECTOR

(75) Inventors: Takehisa Ishihara, Tokyo (JP); Tomotaka Watanabe, Tokyo (JP); Fumihiko Abe, Tokyo (JP); Dongzhi Jin, Tokyo (JP); Kengo Tanaka, Tokyo (JP)

(73) Assignee: The Furukawn Electric Co., Ltd. (JP)

( * ) Notice: Subject to any disclaimer, the term of this patent is extended or adjusted under 35 U.S.C. 154(b) by 71 days.

(21) Appl. No.: 10/448,592

(22) Filed: May 29, 2003

(65) Prior Publication Data

US 2004/0011146 A1    Jan. 22, 2004

(30) Foreign Application Priority Data

May 31, 2002    (JP)    ............................. 2002-158588

(51) Int. Cl.
*G01M 19/00*    (2006.01)

(52) U.S. Cl. .................................................... 73/118.1

(58) Field of Classification Search ............... 73/118.1; 324/207.25; 362/43
See application file for complete search history.

(56) References Cited

U.S. PATENT DOCUMENTS

| | | | |
|---|---|---|---|
| 5,243,188 A * | 9/1993 | Hattori et al. | 250/231.17 |
| 6,155,106 A * | 12/2000 | Sano | 73/118.1 |
| 6,354,396 B1 * | 3/2002 | Horton et al. | 180/446 |
| 6,644,978 B2 * | 11/2003 | Araki | 439/15 |

* cited by examiner

*Primary Examiner*—Robert Raevis
(74) *Attorney, Agent, or Firm*—Cantor Colburn LLP

(57) ABSTRACT

A rotation-sensored rotary connector includes: a rotary connector for electrically connecting an electrical component installed on a steering to a vehicle-body side; and a rotation sensor for detecting a rotational angle of the steering; wherein the rotation sensor includes a rotor to be directly mounted on a steering shaft, and the rotary connector includes a rotor to be rotated in compliance with the rotor of the rotation sensor, thereby allowing to detect the rotational angle of the steering with an excellent precision.

7 Claims, 7 Drawing Sheets

ROTATION-SENSORED ROTARY CONNECTOR

BACKGROUND OF THE INVENTION

1. Field of the Invention

The present invention relates to a rotation-sensored rotary connector comprising: a rotary connector for electrically connecting an electrical component installed on a steering to a vehicle-body side; and a rotation sensor for detecting a rotational angle of the steering.

2. Description of the Prior Art

Included in a conventional type of rotary connector is a structure in which a projection protruded from a rotor of a rotary connector is fitted to a steering, to thereby transmit the driving torque of the steering to the rotor of the rotary connector.

Figure 1:
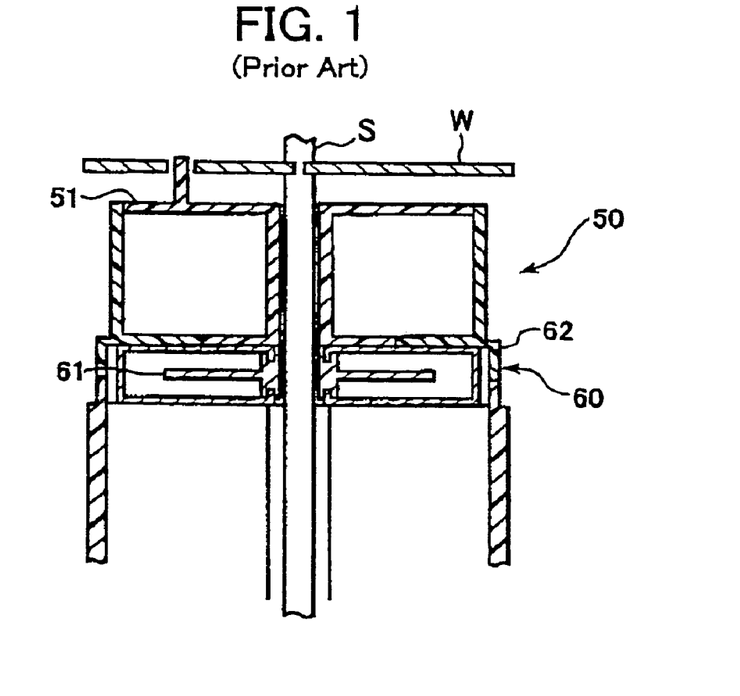
FIG. 1 is a schematic cross-sectional view of a conventional rotation-sensored rotary connector.

JP-A-11-329649 (329649/1999) describes the above-mentioned constitution which further includes a rotation sensor mounted on the rotary connector to thereby unitize them so as to detect a steering angle of the steering by the rotation sensor. FIG. 1 is a schematic cross-sectional view of such a constitution in which the rotor 51 of the rotary connector 50 is mounted to the steering W of a steering shaft S, and the rotation sensor 60 includes a rotor 61 coupled to the rotor 51 via looseness compensating spring (not shown in FIG. 1). Namely, the rotor 61 of the rotation sensor 60 is mounted on the rotor 51 of the rotary connector 50, to thereby transmit the driving torque of the steering W to the rotor 61 of the rotation sensor 60. The rotation sensor 60 further includes a stator 62, and the rotor 61 and stator 62 are provided with sensing members, respectively, so as to detect the rotational angle of the rotor 61 of the rotation sensor 60 as the rotor 61 rotates.

Relatedly, outputs of rotation sensors are exemplarily used as a piece of information of vehicle stability control for stabilizing behavior of a vehicle during running, or used to adjust an oil pressure of a power steering, thereby requiring a strict precision. Thus, outputs of rotation sensors have to be measured precisely.

However, in the above-mentioned constitution, it is likely that the rotational angle can not be detected precisely, because of accumulation of misalignment between the steering shaft S as a measuring target and the rotation sensor 60, including looseness (i.e., play) between the steering shaft S and steering wheel W, and including relative angle deviation between the rotors of the rotary connector 50 and rotation sensor 60 such as due to the looseness compensating spring.

There will be described hereinafter the reason why larger detection errors are caused particularly when the output of the rotation sensor 60 is detected through the rotary connector 50.

The output signal of the rotation sensor 60 has precision which is affected by the looseness between the rotor 61 and stator 62 of the rotation sensor 60. Namely, if the relative positions of the rotor 61 and stator 62 are changed by the looseness therebetween, the output signal is correspondingly changed of course.

It is thus preferable that the relative positions of the rotor 61 and stator 62 of the rotation sensor 60 are always kept unchanged so as to obtain outputs with higher precision, such that the clearance between the rotor 61 and stator 62 is exemplarily restricted to an extremely small value of ±0.2 mm to obtain satisfactory characteristics for products.

Meanwhile, because the required precision of the rotary connector 50 is not so strict as the rotation sensor 60, the rotor 51 of the rotary connector 50 coupled to the steering W has a clearance between the coupling portion of the rotor 51 of the rotary connector 50 and the coupling portion of the steering W which clearance is usually larger than that between the rotor 61 and stator 62 of the rotation sensor 60, and such a larger clearance is generally on the order of ±0.5 mm (which is 2.5 times that for the rotation sensor). Conversely, if no clearance were provided between these coupling portions, the dimensional precision of those members constituting the coupling portions of the steering shaft S and steering W and of the steering W and rotary connector 50 should be set extremely strictly. Even if the members could be machined with such a strict dimensional precision, assembling is made difficult in turn. It is, thus, inevitable to provide a duly larger clearance between the coupling portion of the rotor 51 of the rotary connector 50 and the coupling portion of the steering W.

Therefore, the rotor 61 of the rotation sensor 60 is displaced by an amount corresponding to the above-mentioned looseness concerning the rotary connector 50, in case that the steering angle of the steering W is detected by the rotation sensor 60 through the rotor 51 of the rotary connector 50. Thus, the output signal of the rotation sensor 60 is fluctuated by an amount corresponding to the looseness, thereby failing to detect a steering angle with an excellent precision.

There will be described hereinafter further defects to be caused when the rotation sensor 60 detects the rotational angle of the steering W through the rotary connector 50.

As described above, the clearance between the rotor 61 and stator 62 of the rotation sensor 60 is on the order of ±0.2 mm. Since the stator 62 of the rotation sensor 60 is mounted on a combination switch bracket via cushioning member, the stator 62 is allowed to move by a certain amount correspondingly to the looseness of the rotor 61 of the rotation sensor 60 relative to the stator. However, the looseness compensating capability of the stator 62 of the rotation sensor 60 is occasionally exceeded, such as when the rotor 61 of the rotation sensor 60 is largely moved due to the clearance between the rotor 51 of the rotary connector 50 and the steering W. In such a situation, the rotor 61 of the rotation sensor 60 may impose an excessive side pressure onto the stator 62 to thereby increase the rotational torque of the rotor 61, and in the worst case, the rotor 61 is prevented from rotating to thereby possibly disable the rotational angle detection.

Moreover, the rotor 51 of the rotary connector 50 is generally integrated with a canceling cam (not shown in FIG. 1) for operating a canceling mechanism for blinkers. The canceling cam is to rotate while striking against the canceling mechanism, when the canceling mechanism is to operated. Thus, vibrations upon striking the canceling mechanism in the conventional constitution are inevitably transmitted to the rotor 61 of the rotation sensor 60 through the rotor 51 of the rotary connector 50 because the rotor 61 is coupled to only the rotor 51, thereby possibly affecting the output signal of the rotation sensor 60.

SUMMARY OF THE INVENTION

It is therefore an object of the present invention to provide a rotation-sensored rotary connector capable of detecting a rotational angle of a steering with an excellent precision to thereby solve the above-mentioned problems.

To solve the above problems, the present invention provides a rotation-sensored rotary connector comprising: a rotary connector for electrically connecting an electrical component installed on a steering to a vehicle-body side;

and a rotation sensor for detecting a rotational angle of the steering; wherein the rotation sensor includes a rotor to be directly mounted on a steering shaft, and the rotary connector includes a rotor to be rotated in compliance with the rotor of the rotation sensor.

The rotor of the rotation sensor is directly fitted on the steering shaft. Further, the rotor of the rotation sensor is fitted on the steering shaft, in a manner to minimize the looseness therebetween as less as possible. Namely, the rotation of the steering wheel is not transmitted to the rotation sensor side rotor through the rotary connector side rotor, but the rotation of the steering shaft is directly transmitted to the rotor of the rotation sensor. This structure integrates (rigidifies) the rotor of the rotation sensor with the steering shaft, thereby allowing detecting the rotational angle of the steering shaft by the rotation sensor with an excellent precision.

Further, the rotation-sensored rotary connector is of a type which is necessarily mounted with a rotation sensor by virtue of the structure of the rotation-sensored rotary connector, thereby allowing to mutually integrate a rotor of a rotation sensor and a rotor of a rotary connector in a situation where the rotation sensor and the rotary connector can be manufactured in a series of process.

At this time, the two parts consisting of the rotor of the rotary connector and the rotor of the rotation sensor are integrated into a single part, thereby exemplarily cutting the cost of parts and molds therefor. Further, there is only one fitting portion to the shaft, thereby facilitating the assembling to the shaft.

The rotation-sensored rotary connector recited in Claim 2 of the present invention comprises a rotary connector for electrically connecting an electrical component installed on a steering to a vehicle-body side; and a rotation sensor for detecting a rotational angle of the steering; wherein the rotation sensor includes a rotor to be directly mounted on a steering shaft, and the rotary connector includes a rotor to be rotated in compliance with the rotation of the steering.

Since the rotor of the rotary connector is not coupled to the rotor of the rotation sensor, vibrations to be applied to a canceling cam and to the rotor of the rotary connector upon operation of a blinker canceling mechanism are never transmitted to the rotor of the rotation sensor, thereby allowing to avoid occurrence of detection error of rotational angle due to such vibrations.

From a standpoint of parts assembling, the rotary connector and the rotation sensor can be individually assembled. Namely, it is enough to mutually fit the stators of them, in case of unitizing the latter. Although the rotation sensor may not he assembled depending on user's specifications, the rotary connector can be made of the same parts irrespectively of the presence/absence of the rotation sensor insofar as the rotor of the rotary connector is separated from the rotor of the rotation sensor, thereby allowing to achieve commonization of parts.

In the rotation-sensored rotary connector of claim 1, the rotor of the rotation sensor may be preferably provided with a canceling cam.

The rotor of the rotation sensor is fitted on and integrated with the shaft. Thus, unlike the conventional rotation sensor, the detection by the rotation sensor of the present invention is never rendered to be inaccurate even if vibrations due to rebound of the canceling cam are transmitted to the rotor of the rotation sensor.

In the rotation-sensored rotary connector of claim 1, the rotation-sensored rotary connector may be preferably characterized by a member extended from the rotor of the rotary connector up to that side of the rotation sensor which is far from the rotor of the rotary connector such that the member includes a tip end to be used as a canceling cam.

Although vibrations due to the rebound of the canceling cam are transmitted to the rotor of the rotation sensor through the rotor of the rotary connector, the detection is never rendered to be inaccurate because the rotor of the rotation sensor is fitted on and integrated with the shaft.

In the rotation-sensored rotary connector of claim 1, the rotor of the rotation sensor may be preferably integrated with the rotor of the rotary connector.

This allows to integrate the two parts consisting of the stator of rotary connector and the stator of rotation sensor into a single part, and also to integrate the two parts consisting of the rotor of rotary connector and the rotor of rotation sensor into a single part, thereby exemplarily cutting the cost of parts and molds therefor.

In the rotation-sensored rotary connector of claim 2, the rotary connector and the rotation sensor may be preferably adapted to be individually assembled.

Thus, the rotary connector can be made of the same parts irrespectively of the presence/absence of the rotation sensor insofar as the rotor of the rotary connector is separated from the rotor of the rotation sensor, thereby allowing to achieve commonization of parts.

In the rotation-sensored rotary connector of claim 2, the rotor of the rotation sensor may be preferably provided with a canceling cam.

The rotor of the rotation sensor is fitted on and integrated with the shaft. Thus, unlike the conventional rotation sensor, the detection by the rotation sensor of the present invention is never rendered to be inaccurate even if vibrations due to rebound of the canceling cam are transmitted to the rotor of the rotation sensor.

In the rotation-sensored rotary connector of claim 2, the rotation-sensored rotary connector may be preferably characterized by a member extended from the rotor of the rotary connector up to that side of the rotation sensor which is far from the rotor of the rotary connector such that the member includes a tip end to be used as a canceling cam.

Although vibrations due to the rebound of the canceling cam are transmitted to the rotor of the rotation sensor through the rotor of the rotary connector, the detection is never rendered to be inaccurate because the rotor of the rotation sensor is fitted on and integrated with the shaft.

BRIEF DESCRIPTION OF THE DRAWINGS

The foregoing and other features of the present invention will become apparent to those skilled in the art to which the present invention relates from reading the following description with reference to the accompanying drawings, in which:

FIG. 12 is an enlarged sectional view of the rotation-sensored rotary connector shown in FIG. 4.

DETAILED DESCRIPTION OF THE PREFERRED EMBODIMENTS

There will be explained hereinafter embodiments of a rotation-sensored rotary connector according to the present invention.

Figure 2:
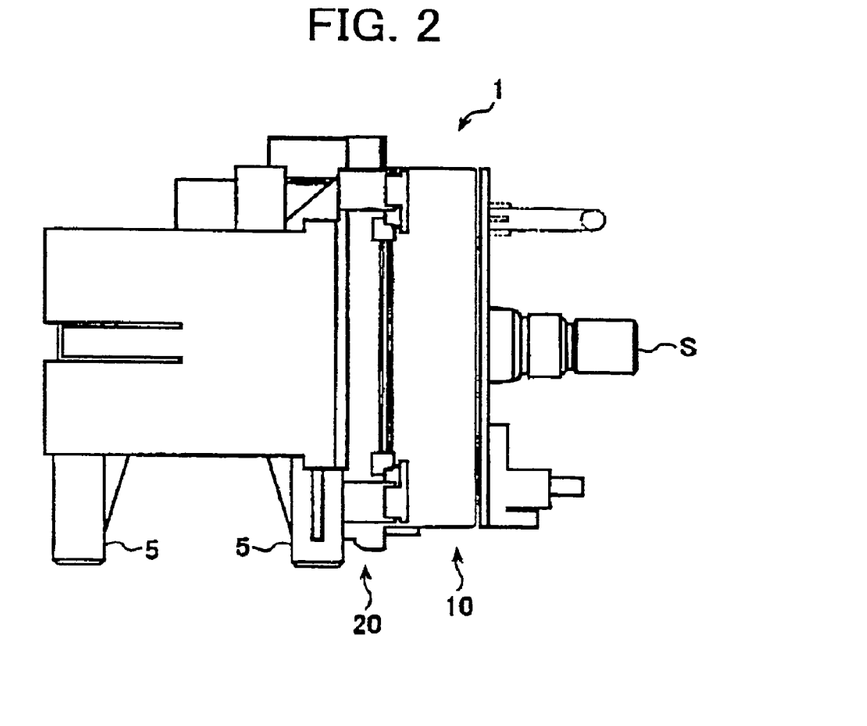
FIG. 2 is a side view of a rotation-sensored rotary connector according to a first embodiment of the present invention.
Figure 3:
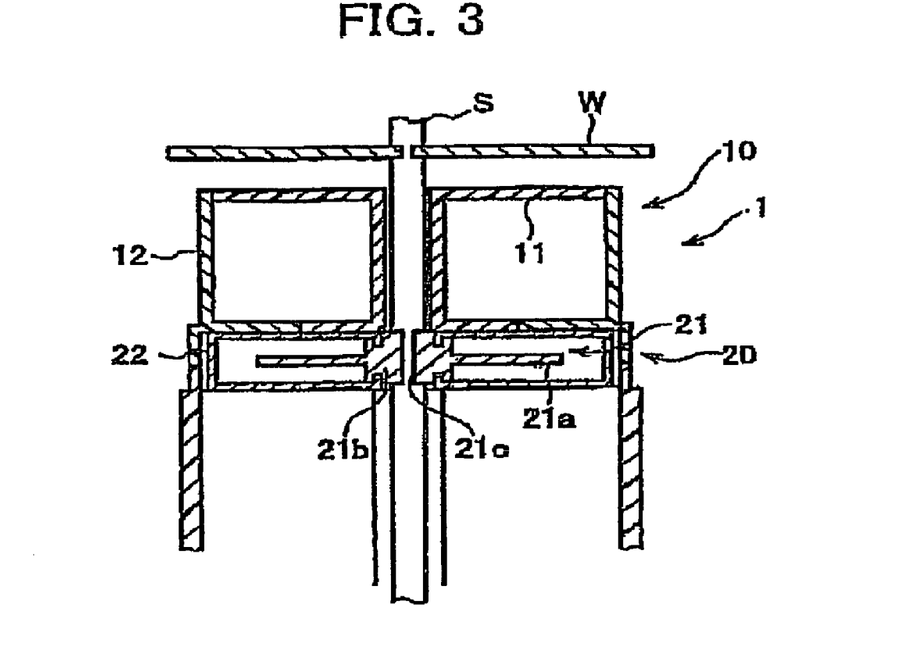
FIG. 3 is a schematic cross-sectional view of the rotation-sensored rotary connector shown in FIG. 2.

The present invention provides a rotation-sensored rotary connector 1 according to a first embodiment shown in an external side view of FIG. 2 and a schematic cross-sectional view of FIG. 3, which comprises; a rotation sensor 20 including a rotor 21 fitted on a steering shafts (herein after simply called "shaft"); and a rotary connector 10 for accommodating the rotation sensor 20 therein and including a rotor 11 of the rotary connector 10 mechanically coupled to the rotor 21 of the rotation sensor 20.

The rotary connector 10 further includes a rotor 11 and a stator 12, and these are made of resin and cooperatively accommodate therein a helically wound flat cable (not shown), thereby serving to electrically connect an electrical component such as an airbag inflator mounted on the steering wheel (hereinafter simply called "steering") W to a vehicle-body side wire harness (not shown).

On the other hand, the rotation sensor 20 is to detect an accurate steering amount of the steering W, and the detecting signal of this sensor is exemplarily utilized for oil pressure control of a power steering or utilized as one factor for vehicle stability control (behavior control) during running of the vehicle.

The rotation sensor 20 further includes a stator 22 made of a metal material such as aluminum or silver having a shielding effect, and the rotation sensor 20 is provided with an engaging projection 102 engaged in an engaging hole of a combination switch bracket 5 via cushioning material 100 as shown in FIG. 12 so that the stator 22 is fixed to the bracket 5. Similarly, the stator 12 of the rotary connector 10 is fixed to the stator 22 of the rotation sensor 20.

The rotor 21 of the rotation sensor 20 comprises a rotor sensing portion 21a in a ring shape and a rotor fixing portion 21b in a stepped cylindrical shape. The rotor fixing portion 21b is made of resin and includes a reduced diameter portion 21c fitted on a serration of the shaft S so as to be rotated integrally therewith. The rotor sensing portion 21a comprises a ring member having a circumferentially varied width and made of an electrically conductive material such as iron. The ring member is rotated in a state where a coil (not shown) accommodated in a magnetic material core is separated from and opposed to the ring member, in a manner to convert a level of generated eddy current into a change of coil impedance, and to detect the impedance change which is then taken out as an angle signal.

The rotor 21 of the rotation sensor 20 is to be mounted on the shaft S with a clearance as small as possible. This allows to rotate the rotor sensing portion 21a of the rotation sensor 20 with an excellent precision, thereby enabling to conduct detection with a higher precision.

Figure 4:
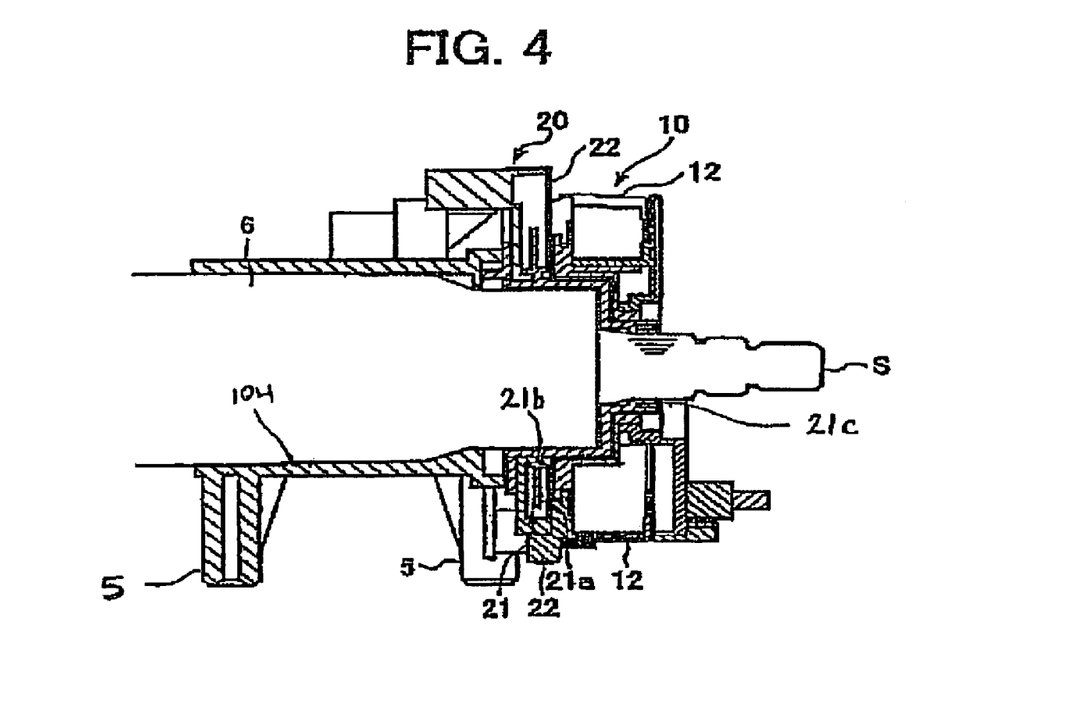
FIG. 4 is a detailed cross-sectional view of the rotation-sensored rotary connector shown in FIG, 3.

The combination switch bracket 5 is in turn fixed to a shaft cover 6 (FIG. 4) by bracket projection 104. However, it is occasional that the shaft cover 6 is fixed to the shaft S with a slight misalignment. As such, the misalignment of the combination switch bracket 5 relative to the shaft S is kept when the stator 22 of the rotation sensor 20 is directly mounted to the combination switch bracket 5. Thus, the cushioning material 100 is provided to compensate for the misalignment, at the mounting portions of the stator 22 of the rotation sensor 20 and the combination switch bracket 5. This causes the stator 22 to be always arranged at a constant position relative to the shaft S.

The provision of the above structure allows to restrict the looseness between the rotor 21 and stator 22 of the rotation sensor 20, to thereby improve the precision of the output signal from the rotation sensor 20.

The rotor 11 of the rotary connector 10 has an inner periphery integrally fitted on an outer periphery of the reduced diameter portion of the rotation sensor 20. Thus, the rotation-sensored rotary connector 1 includes only one fitting portion to the shaft S, thereby facilitating the assembling of the rotation-sensored rotary connector to the shaft S.

There will be subsequently explained hereinafter a configuration for attaching a blinker canceling mechanism to the rotation-sensored rotary connector 1.

Figure 5:
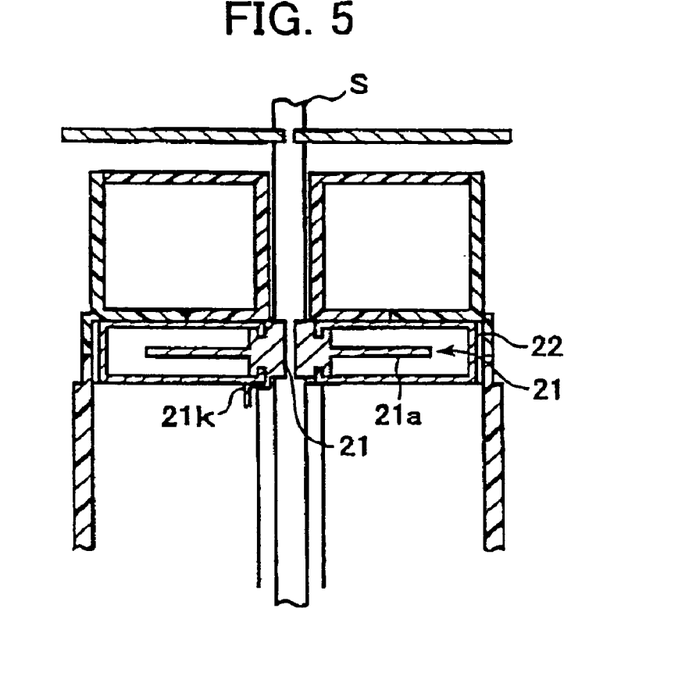
FIG. 5 is a schematic cross-sectional view showing the rotation-sensored rotary connector according to the first embodiment of the present invention in a situation where the rotary connector is provided with a canceling mechanism.

FIG. 5 shows a structure where the rotation sensor rotor 21 is provided with a canceling cam 21k. The rotation sensor rotor 21 is fitted on and integrated with the shaft S as described above. Thus, unlike the conventional rotation sensor 60, the detection by the rotation sensor of the present invention is never rendered to be inaccurate even if vibrations due to rebound of the canceling cam 21k are transmitted to the rotation sensor rotor 21.

Figure 6:
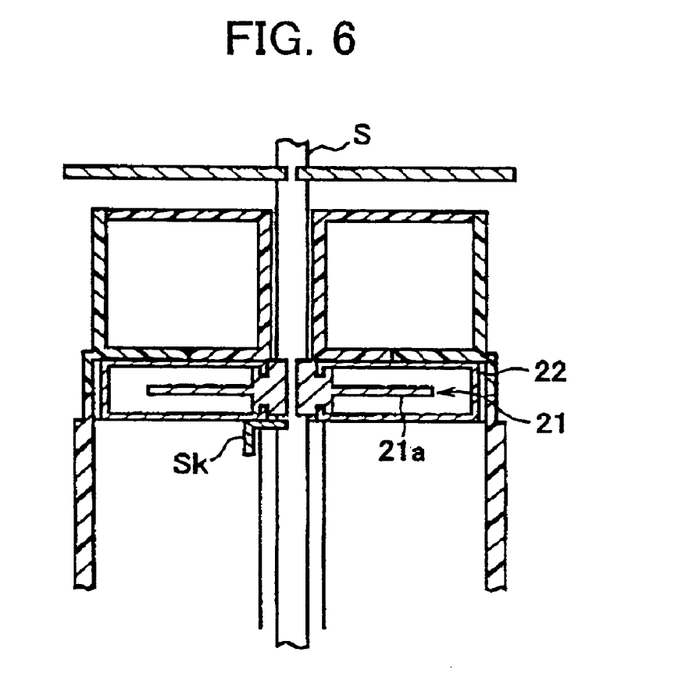
FIG. 6 is a schematic cross-sectional view showing a modified embodiment of the rotary connector in FIG. 5.

FIG. 6 shows a structure where the shaft S is provided with a canceling cam Sk. In this case, vibrations due to the rebound of the canceling cam Sk are scarcely transmitted to the rotation sensor rotor 21. Further, unlike the conventional rotation sensor 60, the detection by the rotation sensor of the present invention is never rendered to be inaccurate, even if such vibrations are transmitted.

Moreover, although the structure becomes slightly complicated, it is possible to include a member extended from the rotor 11 of the rotary connector 10 to a position below the rotation sensor 20 such that the tip end of the extended member is used as a canceling cam, as a structure equivalent Lo that shown in FIG. 10 including a structure of a canceling cam in the embodiment to be described later. Although vibrations due to the rebound of the canceling cam are transmitted to the rotor 21 of the rotation sensor 20 through the rotor 11 of the rotary connector 10 in this case, the detection is never rendered to be inaccurate identically to the above because the rotation sensor rotor 21 is fitted on and integrated with the shaft S.

In the above described rotation-sensored rotary connector 1 according to the first embodiment of the present invention, the rotation sensor 20 precisely detects the steering angle of the steering W while avoiding adverse effects due to the rebound of the blinker canceling cam.

It is possible that the stator 22 of the rotation sensor 20 is directly mounted onto the combination switch bracket 5, or the stator 22 is integrated with the stator 12 of the rotary connector 10 and this integrated part is mounted onto the combination switch bracket 5.

It is also possible that the rotor 21 of the rotation sensor 20 is integrated with the rotor 11 of the rotary connector 10. This allows to integrate the two parts consisting of the stator 12 of rotary connector 10 and the stator 22 of rotation sensor 20 into a single part, and also to integrate the two parts consisting of the rotor 11 of rotary connector 10 and the rotor 21 of rotation sensor 20 into a single part, thereby advantageously and exemplarily cutting the cost of parts and molds therefor.

Concerning the rotation sensor 20, the present invention is not limited to the rotation sensor 20 adopting the detection principle according to the above embodiment, and it is possible to utilize rotation sensors based on various principles.

There will be explained hereinafter a rotation-sensored rotary connector according to a second embodiment of the present invention.

Similar reference numerals are used for those constitutions equivalent to the above, and the detailed description thereof shall be omitted.

Figure 7:
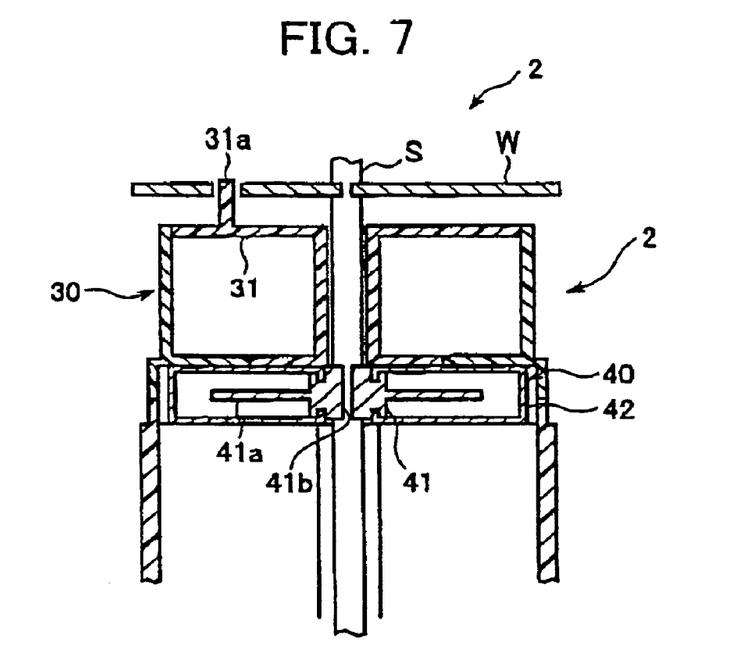
FIG. 7 is a schematic cross-sectional view of a rotation-sensored rotary connector according to a second embodiment of the present invention.
Figure 8:
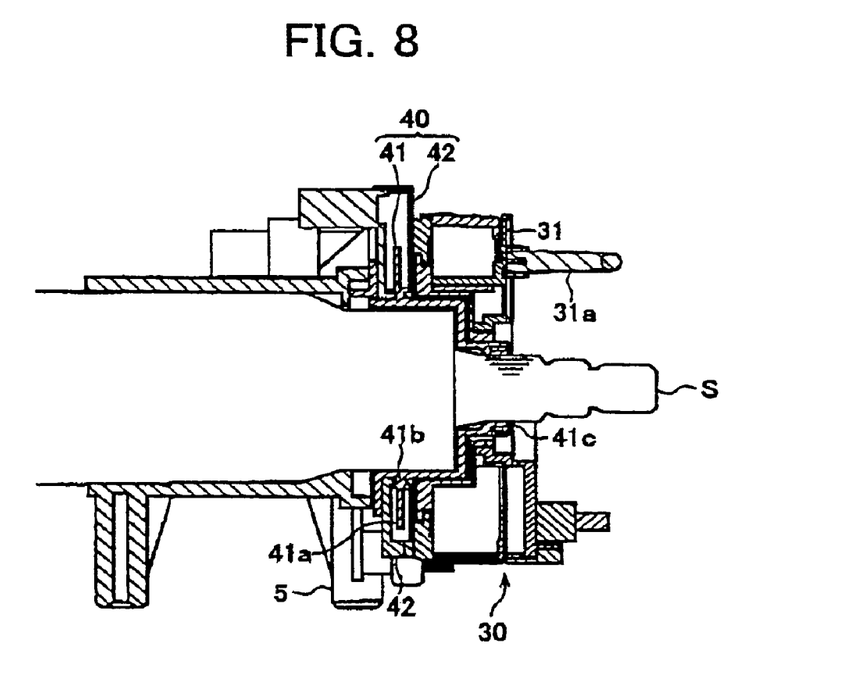
FIG. 8 is a detailed cross-sectional view of the rotation-sensored rotary connector shown in FIG. 7.

The present invention provides a rotation-sensored rotary connector 2 according to a second embodiment shown in a schematic cross-sectional view of FIG. 7 and a detailed cross-sectional view of FIG. 8, which comprises: a rotation sensor 40 including a rotor 41 fitted on the shaft S; and a rotary connector 30 for accommodating the rotation sensor 40 therein and including a rotor 31 mounted to the steering W.

The interior structures such as of the rotary connector 30 and rotation sensor 40 are the same as those in the first embodiment.

The rotation sensor 40 further includes a stator 42 made of a metal material such as aluminum or silver having a shielding effect, and the rotation sensor 40 is provided with an engaging projection (not shown) engaged in an engaging hole of the combination switch bracket 5 via cushioning material as shown in FIG. 8 so that the stator 42 is fixed to the bracket 5.

Meanwhile, the rotor 31 of the rotary connector 30 is integrally formed with a steering-coupling projection 31a protruded therefrom, and the projection 31a is coupled to the steering W (not shown in FIG, 8) so that the rotation of the steering W is transmitted to the rotor 31 of the rotary connector 30.

Namely, unlike the first embodiment, the rotor 31 of the rotary connector 30 is transmitted with a torque not from the rotor 41 of the rotation sensor 40 but from the steering W.

The rotor 41 of the rotation sensor 40 comprises a rotor sensing portion 41a in a ring shape and a rotor fixing portion 41b in a stepped cylindrical shape. The rotor fixing portion 41b is made of resin and includes a reduced diameter portion 41c (FIG. 8) fitted on a serration of the shaft S, so as to be rotated integrally therewith.

The rotor 41 of the rotation sensor 40 is mounted on the shaft S with a clearance as small as possible, thereby allowing to conduct detection with a higher precision. At the mounting portions of the stator 42 of rotation sensor 40 and of the combination switch bracket, there is provided a cushioning material for compensating for the misalignment of the combination switch bracket relative to the shaft S. The above structure allows to restrict the looseness between the rotor 41 and stator 42 of the rotation sensor 40, to thereby improve the precision of the output signal from the rotation sensor 40.

The rotation-sensored rotary connector 2 according to the second embodiment of the present invention has the above constitution, thereby enabling to individually assemble the rotary connector 30 and the rotation sensor 40 from a standpoint of parts assembling. Namely, it is enough to mutually fit the stators of them, in case of unitizing the latter. Although the rotation sensor 40 may not be assembled depending on user's specifications, the rotary connector 30 can be made of the same parts irrespectively of the presence/absence of the rotation sensor 40 insofar as the rotor 31 of the rotary connector 30 is separated from the rotor 41 of the rotation sensor 40, thereby allowing to achieve commonization of parts.

There will be subsequently explained hereinafter a configuration for attaching a blinker canceling mechanism to the rotation-sensored rotary connector 2.

Figure 9:
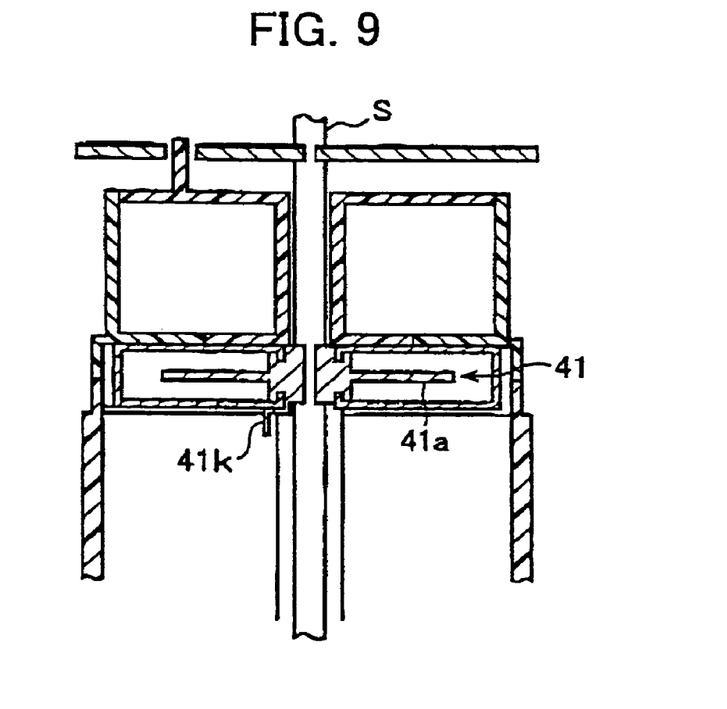
FIG. 9 is a schematic cross-sectional view showing the rotation-sensored rotary connector according to the second embodiment of the present invention in a situation where the rotary connector is provided with a canceling mechanism.

FIG. 9 shows a structure where the rotation sensor rotor 41 is provided with a canceling cam 41k. The rotation sensor rotor 41 is fitted on and integrated with the shaft S as described above. Thus, unlike the conventional rotation sensor 60, the detection by the rotation sensor of the present invention is never rendered to be inaccurate even if vibrations due to rebound of the canceling cam 41k are transmitted to the rotation sensor rotor 41.

Figure 10:
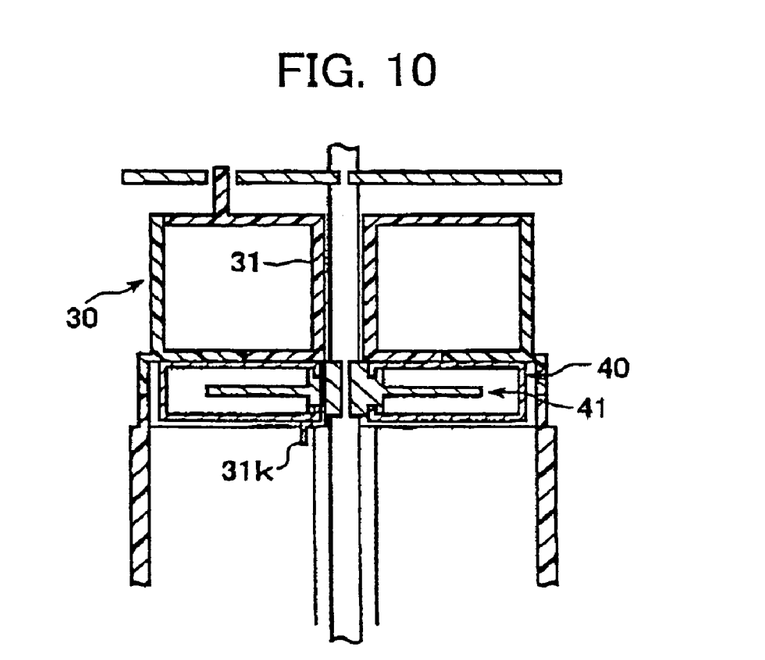
FIG. 10 is a schematic cross-sectional view showing a modified embodiment of the rotary connector in FIG. 9.

FIG. 10 shows a structure including a member extended from the rotor 31 of the rotary connector 30 to a position below the rotation sensor 40 such that the tip end of the extended member is used as a canceling cam 31k. Although vibrations due to the rebound of the canceling cam 31k are transmitted to the rotor 41 of the rotation sensor 40 through the rotor 31 of the rotary connector 30 in this case, the detection is never rendered to be inaccurate identically to the above because the rotation sensor rotor 41 is fitted on and integrated with the shaft S.

Figure 11:
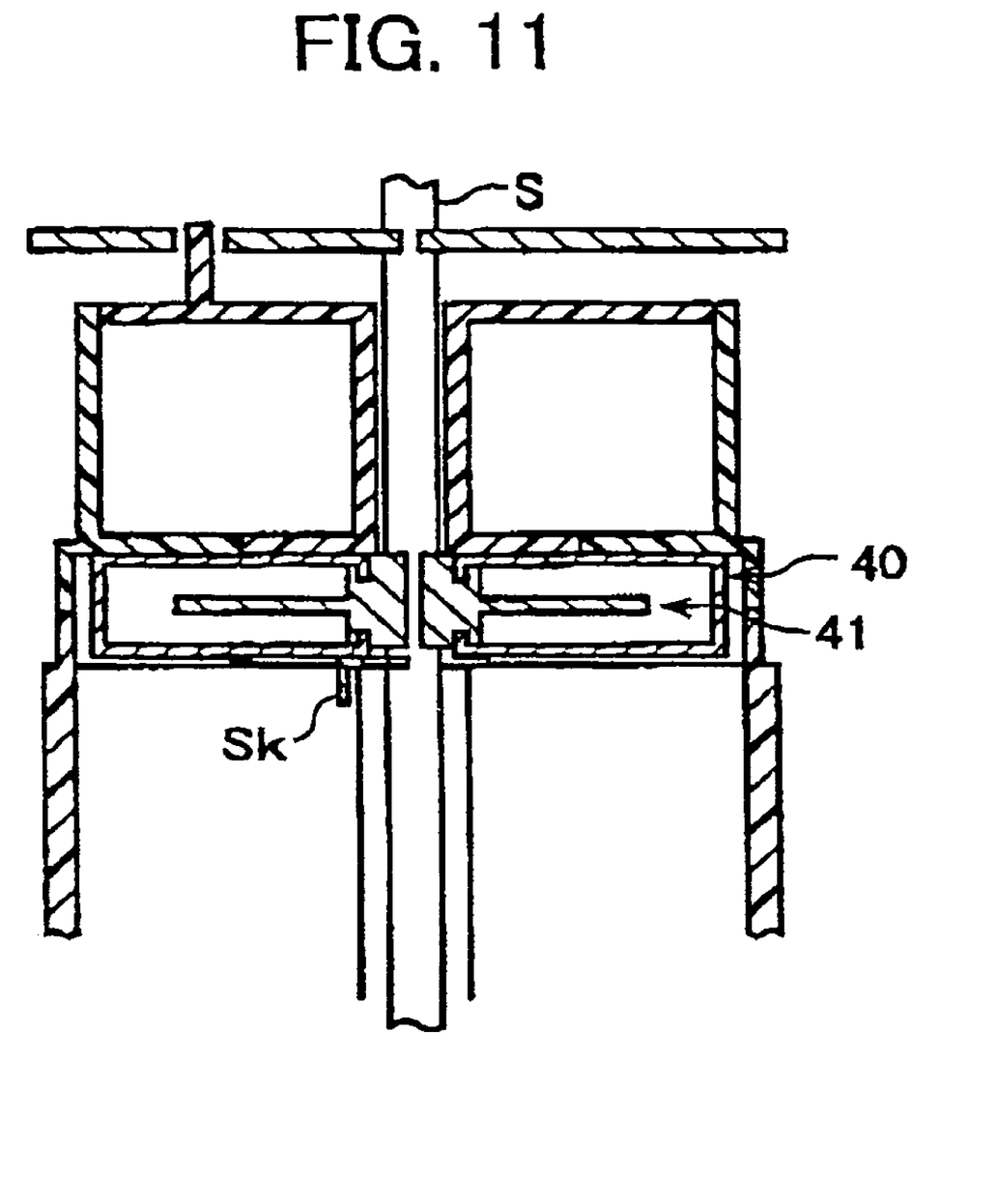
FIG. 11 is a schematic cross-sectional view showing a further modified embodiment of the rotary connector in FIG. 9.
Figure 13:
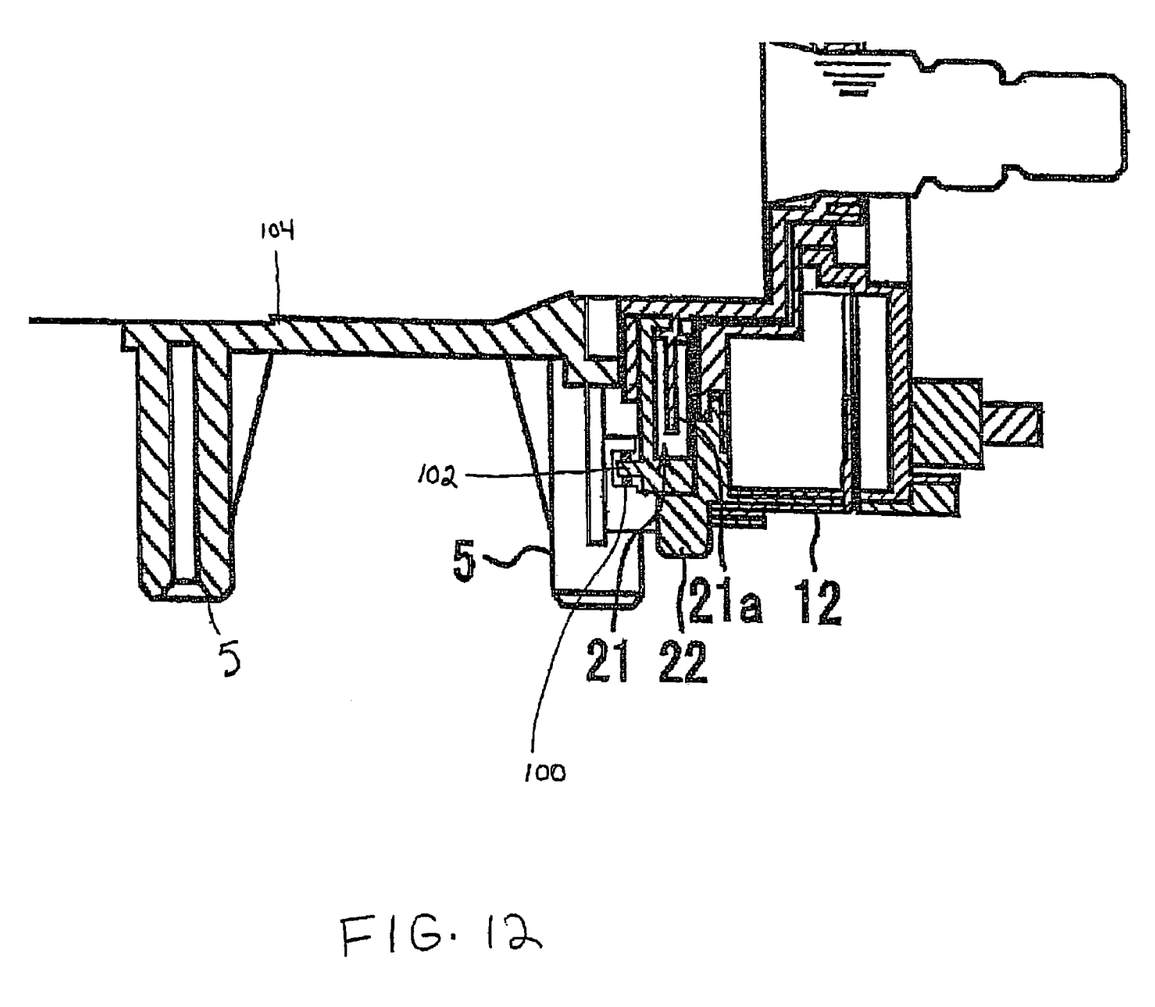

FIG. 11 shows a structure where the shaft S is provided with a canceling cam Sk. In this case, vibrations due to the rebound of the canceling cam Sk are scarcely transmitted to the rotor 41 of the rotation sensor. Further, unlike the conventional rotation sensor 60, the detection by the rotation sensor of the present invention is never rendered to be inaccurate, even if such vibrations are transmitted.

In the above described rotation-sensored rotary connector according to Claim 1, the rotor of the rotation sensor is directly fitted on the steering shaft. Further, the rotor of the rotation sensor is fitted on the steering shaft, in a manner to minimize the looseness therebetween as less as possible.

Namely, the rotation of the steering wheel is not transmitted to the rotation sensor side rotor through the rotary connector side rotor, but the rotation of the steering shaft is directly transmitted to the rotor of the rotation sensor. This structure integrates (rigidifies) the rotor of the rotation sensor with the steering shaft, thereby allowing to detect the rotational angle of the steering shaft by the rotation sensor with an excellent precision.

This further allows to integrate the two parts consisting of the rotor of rotary connector and the rotor of rotation sensor into a single part, thereby exemplarily cutting the cost of parts and molds therefor. Further, there is only one fitting portion to the shaft S, thereby facilitating the assembling to the shaft S.

Further, the rotation-sensored rotary connector according to Claim 2 of the present invention allows the rotary connector and the rotation sensor to be individually assembled, from a standpoint of parts assembling. Namely, it is enough to mutually fit the stators of them, in case of unitizing the latter. Although the rotation sensor may not be assembled depending on user's specifications, the rotary connector can be made of the same parts irrespectively of the presence/absence of the rotation sensor insofar as the rotor of the rotary connector is separated from the rotor of the rotation sensor, thereby allowing to achieve commonization of parts.

The invention claimed is:

1. A rotation-sensored rotary connector comprising:
   a rotary connector for electrically connecting an electrical component installed on a steering shaft or a steering wheel to a vehicle-body side; and
   a rotation sensor for detecting a rotational angle of the steering shaft;
   a combination switch bracket fixed to a shaft cover;
   a cushioning material at a mounting portion of a stator of the rotation sensor and the combination switch bracket;
   wherein said rotation sensor includes a rotor to be directly fitted on the steering shaft, and said rotary connector includes a rotor to be rotated in compliance with said rotor of said rotation sensor;
   wherein said rotor of said rotation sensor is configured to rotate integrally with the steering shaft;
   wherein said rotor of said rotation sensor comprises a rotor sensing portion and a rotor fixing portion;
      wherein said rotor sensing portion is configured substantially in a ring shape and is provided on an outer periphery of the shaft cover; and
      wherein said rotor fixing portion is configured substantially in a stepped cylindrical shape, said rotor fixing portion comprising a reduced diameter portion fitted on the steering shaft such that the rotor fixing portion is rotated integrally with the steering shaft; and
   wherein said rotor sensing portion is disposed at a predetermined distance from an outer surface of the reduce diameter portion, the predetermined distance being in a direction away from the steering shaft.

2. The rotation-sensored rotary connector of claim 1, wherein said rotor of said rotation sensor is provided with a canceling cam.

3. The rotation-sensored rotary connector of claim 1, wherein the rotary connector is fitted on an outer periphery of the reduced diameter portion.

4. A rotation-sensored rotary connector comprising:
   a rotary connector for electrically connecting an electrical component installed on a steering shaft or a steering wheel to a vehicle-body side; and
   a rotation sensor for detecting a rotational angle of the steering shaft;
   a combination switch bracket fixed to a shaft cover;
   a cushioning material at a mounting portion of a stator of the rotation sensor and the combination switch bracket;
   wherein said rotation sensor includes a rotor to be directly fitted on the steering shaft, and said rotary connector includes a rotor to be rotated in compliance with the rotation of the steering shaft;
   wherein said rotor of said rotation sensor comprises a rotor sensing portion and a rotor fixing portion;
      wherein said rotor sensing portion is configured substantially in a ring shape and is provided on an outer periphery of the shaft cover; and
      wherein said rotor fixing portion is configured substantially in a stepped cylindrical shape, said rotor fixing portion comprising a reduced diameter portion fitted on the steering shaft such that the rotor fixing portion is rotated integrally with the steering shaft; and
   wherein said rotor sensing portion is disposed at a predetermined distance from an outer surface of the reduce diameter portion, the predetermined distance being in a direction away from the steering shaft.

5. The rotation-sensored rotary connector of claim 4, wherein said rotary connector and said rotation sensor are adapted to be individually assembled.

6. The rotation-sensored rotary connector of claim 4, wherein said rotor of said rotation sensor is provided with a canceling cam.

7. The rotation-sensored rotary connector of claim 4, wherein the rotary connector is fitted on an outer periphery of the reduced diameter portion.

* * * * *